US010650039B2

(12) United States Patent
Mariner (10) Patent No.: US 10,650,039 B2
(45) Date of Patent: May 12, 2020

(54) CUSTOMIZABLE WORLD MAP

(71) Applicant: Gary Mariner, Marietta, GA (US)

(72) Inventor: Gary Mariner, Marietta, GA (US)

(73) Assignee: Lionheart Legacy UCO, Marietta, GA (US)

( * ) Notice: Subject to any disclaimer, the term of this patent is extended or adjusted under 35 U.S.C. 154(b) by 271 days.

(21) Appl. No.: 15/444,177

(22) Filed: Feb. 27, 2017

(65) Prior Publication Data

US 2017/0249062 A1 Aug. 31, 2017

Related U.S. Application Data

(60) Provisional application No. 62/299,855, filed on Feb. 25, 2016.

(51) Int. Cl.
*G06F 16/44* (2019.01)
*G06T 11/60* (2006.01)
(Continued)

(52) U.S. Cl.
CPC .......... *G06F 16/444* (2019.01); *G06F 16/29* (2019.01); *G06T 11/60* (2013.01); *G06F 2203/04806* (2013.01); *H04N 1/00196* (2013.01)

(58) Field of Classification Search
CPC ......... G06F 17/30241; G06F 17/30598; G06T 11/60; G06T 3/4038; G06K 9/6218
See application file for complete search history.

(56) References Cited

U.S. PATENT DOCUMENTS 6,321,158 B1 * 11/2001 DeLorme ............... G01C 21/26
340/995.16
6,741,864 B2 * 5/2004 Wilcock ............ H04N 1/00127
455/456.1
(Continued)

FOREIGN PATENT DOCUMENTS

JP 10181241 A * 7/1998
KR 20100115968 A * 10/2010

OTHER PUBLICATIONS

Brad Pierce; "Brad's Flying Adventure Across America"; http://www.bradinmotion.com/2011/09/07/brads-flying-adventure-across-america/; Sep. 7, 2011; 8 pages (Year: 2011).*
(Continued)

*Primary Examiner* — Scott T Baderman
*Assistant Examiner* — Benjamin Smith
(74) *Attorney, Agent, or Firm* — Lombard & Geliebter LLP; Eric J. Huang (57) ABSTRACT

Computer implemented methods for publishing a personalized map are provided that include receiving, via a server computer coupled to at least one client device over a communications network, a plurality of media files; associating each of the plurality of media files with at least one location one each of a plurality of personal maps, wherein the plurality of personal maps comprise a map of a geographic region and a map of a sub-region of the geographic region; and causing an interface to be displayed at the at least one client device, the interface displaying a personalized map of the geographic region with a plurality of slots associated with the plurality of sub-regions thereof, slots having at least one media file associated therewith generated to include content from the at least one media file and slots without at least one media file association generated with solid fill.

14 Claims, 9 Drawing Sheets

(51) Int. Cl.
*G06F 16/29* (2019.01)
*H04N 1/00* (2006.01)

(56) References Cited

U.S. PATENT DOCUMENTS

| | | | | |
|---|---|---|---|---|
| 7,231,607 B2* | 6/2007 | Neely | ................ | H04N 1/00442 715/747 |
| 7,765,461 B2* | 7/2010 | Suzuki | ................ | G11B 19/025 715/200 |
| 8,243,988 B1* | 8/2012 | Buddemeier | ...... | G06K 9/00677 382/103 |
| 8,352,465 B1* | 1/2013 | Jing | ................ | G06F 16/54 707/723 |
| 8,411,968 B2* | 4/2013 | Isomura | ................ | G06T 11/60 382/224 |
| 8,457,346 B2* | 6/2013 | Rodriguez | ............. | G01S 19/14 382/100 |
| 8,631,322 B2* | 1/2014 | Isomura | ................ | G09B 29/10 715/253 |
| 8,638,979 B2* | 1/2014 | Singhal | ................ | G06K 9/3233 340/5.52 |
| 8,811,775 B1* | 8/2014 | Chao | ................ | G06F 3/04817 382/305 |
| 8,843,478 B1* | 9/2014 | Jing | ................ | G06F 16/54 707/723 |
| 8,971,665 B2* | 3/2015 | Zhang | ................ | G06K 9/6219 382/286 |
| 8,973,141 B2* | 3/2015 | Rowland | ................ | H04L 63/20 726/23 |
| 8,976,198 B2* | 3/2015 | Borders | ................ | G06T 11/60 345/629 |
| 8,996,305 B2* | 3/2015 | Kesar | ................ | H04W 4/185 701/438 |
| 9,015,579 B2* | 4/2015 | Jin | ................ | G06F 17/248 715/243 |
| 9,372,592 B1* | 6/2016 | Goodspeed | ........... | G06F 3/0481 |
| 9,411,831 B2* | 8/2016 | Baldwin | ................ | G06F 16/51 |
| 9,418,482 B1* | 8/2016 | Yang | ................ | G06T 19/006 |
| 9,437,120 B2* | 9/2016 | Chow | ................ | G09B 29/007 |
| 9,465,813 B1* | 10/2016 | Li et al. | ............ | G06K 9/00268 |
| 9,524,287 B2* | 12/2016 | Mahoney | ................ | G06F 3/04842 |
| 9,535,584 B2* | 1/2017 | Dai | ................ | G06F 16/954 |
| 9,589,322 B2* | 3/2017 | Rae | ................ | G06K 9/4642 |
| 9,633,122 B2* | 4/2017 | Reynar | ................ | G06Q 30/02 |
| 9,733,814 B1* | 8/2017 | Al-Ghamdi | ............ | H04L 51/32 |
| 9,811,927 B2* | 11/2017 | Rowland | ................ | H04L 63/20 |
| 10,009,232 B2* | 6/2018 | Duncan | ................ | H04L 41/22 |
| 10,145,704 B2* | 12/2018 | Lanza | ................ | G09B 29/007 |
| 10,147,215 B2* | 12/2018 | Lanza | ................ | G06T 11/60 |
| 2003/0182052 A1* | 9/2003 | DeLorme | ................ | G01C 21/26 701/533 |
| 2005/0169499 A1* | 8/2005 | Rodriguez | ............ | G01S 19/14 382/100 |
| 2005/0210413 A1* | 9/2005 | Quek | ................ | G03D 15/005 715/838 |
| 2006/0142942 A1* | 6/2006 | Pyo | ................ | G01C 21/32 701/431 |
| 2006/0181631 A1* | 8/2006 | Suzuki | ................ | G11B 19/025 348/333.02 |
| 2006/0220983 A1* | 10/2006 | Isomura | ................ | G09B 29/10 345/1.1 |
| 2007/0040329 A1* | 2/2007 | Redd | ................ | A63F 3/04 273/236 |
| 2007/0073562 A1* | 3/2007 | Brice | ................ | G06Q 10/02 705/5 |
| 2008/0050039 A1* | 2/2008 | Jin | ................ | G06F 17/248 382/284 |
| 2008/0062283 A1* | 3/2008 | Matsushita | ............ | G06T 1/00 348/231.99 |
| 2008/0300784 A1* | 12/2008 | Kleinstern | ............ | G01C 21/28 701/431 |
| 2008/0304431 A1* | 12/2008 | Karaoguz | ................ | G06Q 10/109 370/310 |
| 2008/0312987 A1* | 12/2008 | Damodaran | ........ | G06Q 10/0633 705/7.27 |
| 2009/0063646 A1* | 3/2009 | Mitnick | ................ | G06Q 10/10 709/206 |
| 2009/0116752 A1* | 5/2009 | Isomura | ................ | G06T 11/60 382/217 |
| 2009/0303251 A1* | 12/2009 | Balogh | ................ | G06T 17/005 345/632 |
| 2009/0319931 A1* | 12/2009 | Hutchings | ............ | G06F 3/0481 715/771 |
| 2010/0149212 A1* | 6/2010 | Fukuya | ................ | G06K 9/6219 345/629 |
| 2010/0179816 A1* | 7/2010 | Wu | ................ | G06Q 10/06 705/1.1 |
| 2011/0096075 A1* | 4/2011 | Borders | ................ | G06T 11/60 345/441 |
| 2011/0200273 A1* | 8/2011 | Singhal | ................ | G06K 9/3233 382/284 |
| 2011/0202469 A1* | 8/2011 | Venkateswaran | ..... | G06F 3/0486 705/301 |
| 2011/0267369 A1* | 11/2011 | Olsen | ................ | G01C 21/3647 345/634 |
| 2011/0285748 A1* | 11/2011 | Slatter | ................ | G06T 11/60 345/629 |
| 2012/0142434 A1* | 6/2012 | Haruki | ................ | A63F 13/79 463/43 |
| 2012/0154418 A1* | 6/2012 | Mikawa | ................ | G01C 21/3682 345/581 |
| 2012/0162252 A1* | 6/2012 | Endo | ................ | G09B 29/106 345/629 |
| 2012/0297301 A1* | 11/2012 | Mahoney | ............ | G06F 3/04842 715/716 |
| 2012/0297327 A1* | 11/2012 | Chow | ................ | G09B 29/007 715/765 |
| 2012/0306922 A1* | 12/2012 | Kadous | ................ | G01C 21/20 345/634 |
| 2013/0104026 A1* | 4/2013 | Reynar | ................ | G06Q 30/02 715/234 |
| 2013/0111373 A1* | 5/2013 | Kawanishi | ............ | G06T 11/60 715/762 |
| 2013/0150124 A1* | 6/2013 | Kim | ................ | H04W 64/00 455/556.1 |
| 2013/0332068 A1* | 12/2013 | Kesar | ................ | H04W 4/185 701/430 |
| 2014/0207781 A1* | 7/2014 | Quack | ................ | G06K 9/00664 707/738 |
| 2014/0267279 A1* | 9/2014 | Kontkanen | ............ | G06T 15/04 345/427 |
| 2014/0280503 A1* | 9/2014 | Cronin | ................ | H04L 67/22 709/203 |
| 2014/0282871 A1* | 9/2014 | Rowland | ................ | H04L 63/20 726/3 |
| 2014/0337324 A1* | 11/2014 | Chao | ................ | G06F 3/04817 707/722 |
| 2015/0046194 A1* | 2/2015 | Waddell | ................ | G06Q 40/04 705/4 |
| 2015/0170333 A1* | 6/2015 | Jing | ................ | G06F 16/532 345/660 |
| 2015/0261785 A1* | 9/2015 | Ma | ................ | G06F 3/1407 345/629 |
| 2015/0287225 A1* | 10/2015 | Rowland | ................ | H04L 63/20 345/440 |
| 2015/0355817 A1* | 12/2015 | Dai | ................ | G06F 16/954 715/763 |
| 2015/0369623 A1* | 12/2015 | Blumenberg | ........ | G01C 21/367 701/532 |
| 2016/0071496 A1* | 3/2016 | Jones | ................ | G06F 16/29 345/636 |
| 2016/0358042 A1* | 12/2016 | Fu | ................ | G06T 11/60 |
| 2016/0380844 A1* | 12/2016 | Duncan | ................ | H04L 41/22 715/736 |
| 2017/0026528 A1* | 1/2017 | Kim | ................ | H04L 67/42 |
| 2017/0069123 A1* | 3/2017 | Hochmuth | ............ | G09G 5/377 |
| 2017/0301117 A1* | 10/2017 | Lanza | ................ | G09B 29/007 |
| 2017/0301118 A1* | 10/2017 | Lanza | ................ | G06T 11/60 |

(56) References Cited

U.S. PATENT DOCUMENTS

2017/0337648 A1* 11/2017 Berg ................... G06Q 50/16
2018/0075061 A1* 3/2018 Purumala ............ G06F 16/29
2019/0163349 A1* 5/2019 Derner ................ G06F 16/29

OTHER PUBLICATIONS

Kurt E. Clothier; "United States Photo Map"; https://www.instructables.com/id/United-States-Photo-Map/; 2016; 28 pages (Year: 2016).*
Kelsie Ann Sausaman; Cut, Craft, Create: "Personalized Photo Map {for our Paper Anniversary}"; 48 pages; Feb. 8, 2014; http://cutcraftcreate.blogspot.com/2014/02/personalized-photo-map-for-our-paper.html (Year: 2014).*

* cited by examiner

CUSTOMIZABLE WORLD MAP

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Field of the Invention

This application generally relates to computer-implemented methods for generating digital maps, and in particular, creating digital maps that can be personalized with media provided by users.

Description of the Related Art

Genealogy and social networks, to this date, have not been combined to offer a user the capability to leave their lasting memory. For example, current genealogy offerings allow a user the capability to look up documentation or findings of relatives from the past as well as to connect them and discover their family history. Social networks allow people to connect in the current day, allowing users the capability of documenting their travels and life moments through picture and video uploads. Each of these uploads have a geo-tagged location attached to them based on user input or obtained from a media device. Utilizing such information creates points located on a provided map for the user to track their travels. However, while the means to connect with your families past and your current family remain separate as well as the ability to reconnect with them, the two have yet to be combined socially.

With the continued growth of online personalization, and the steady growth of the travel industry, mapping your travels or documenting your travels, experiences or life events are heavily focused on. Online offerings of that remain in the social world but have yet moved over to the genealogical scene. In the social world, digital map renderings are simple in design with most showcasing a pinpoint mapping system. Accordingly, there is a need for systems that are not so limited.

SUMMARY OF THE INVENTION

In at least one aspect, computer systems and corresponding computer implemented method for publishing a personalized map is provided that includes the steps of: receiving, via a server computer coupled to at least one client device over a communications network, a plurality of media files; associating, via the server computer, each of the plurality of media files with at least one location one each of a plurality of personal maps, wherein the plurality of personal maps comprise a map of a geographic region and a map of a sub-region of the geographic region; and causing an interface to be displayed at the at least one client device, the interface displaying a personalized map of the geographic region with a plurality of slots associated with the plurality of sub-regions thereof, slots having at least one media file associated therewith generated to include content from the at least one media file and slots without at least one media file association generated with solid fill, each of the sub-regions on the map of the geographic region representing a clickable area for drilling down to a selected sub-region.

In at least one embodiment, the method includes associating each of the plurality of media files with a map of a sub-sub-region of the geographic region.

In at least one embodiment, the method includes causing an interface to be displayed at the at least one client device, the interface displaying a sub-region of the geographic region with a plurality of slots associated with a plurality of sub-sub-regions of the geographic region, each of the sub-sub-regions on the map of the sub-region geographic region representing a clickable area for drilling down to a selected sub-sub-region.

In at least one embodiment, the plurality of slots each have a shape of a respective sub-region and sub-sub regions.

In at least one embodiment, the plurality of media files are associated with a plurality of events, the method including generating at at least one geographic level a list of events associated with the personalized map of the at least one geographic level.

In at least one embodiment, at least one of the media files is associated with a first sub-region and another of the media files is associated with a second sub-region, the method including generating a list of events at a geographic level associated with the geographic region comprising events associated with both the first and second sub-regions, and a list of events at a geographic level associated with the sub-regions comprising events associated with only a selected sub-region.

In at least one embodiment, the method includes receiving a selection of an event and generating a link to a slideshow presentation of the media files associated with the selected event.

In at least one embodiment, the method includes receiving a selection of an event and generating a link to a presentation comprising audio associated with the event.

In at least one embodiment, the media files are associated with personal maps based on geo-tag embedded in the media files.

In at least one embodiment, the plurality of slots each have a shape of a respective sub-region and wherein the content from the media file fills the shape of the respective sub-region.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

Embodiments of the present invention, as described herein, allow users to create a personal autobiography of their travels and life. Specifically, users can create a personalized digital map of their travels to share to the world and create a real time autobiography. Embodiments of the present invention can bring the business of personalized world maps into the hands of every mobile user, with full customization and personalization. Broadly, an embodiment of the present invention provides a system for customizing and publishing a personalized map, comprising: a computer having a user interface; and a program product comprising machine-readable program code for causing, when executed, the computer to perform at least the following process steps: creating a unique user account that links to a digital representation of a user customized map; uploading at least one of pictures and/or video to the program product, associating the at least one of pictures and/or video to an area of the map that the pictures and video were taken; and displaying the customized map on a social network.

Figure 1:
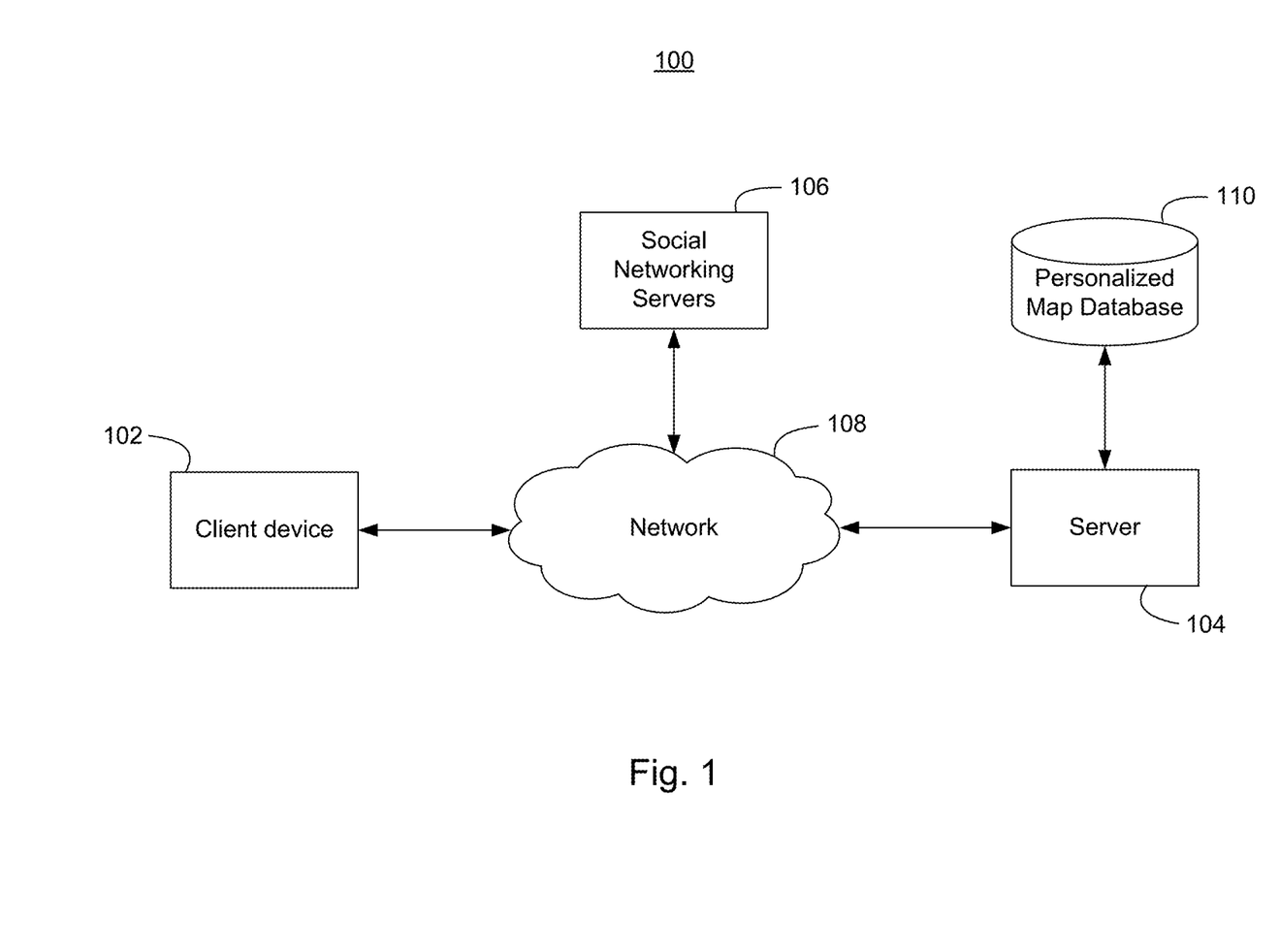
FIG. 1 illustrates a computing system according to an embodiment of the present invention.

FIG. 1 illustrates a computing system according to an embodiment of the present invention. The system presented in FIG. 1 includes client device 102, server 104, social networking servers 106, and network 108. Client device 102 may comprise a computing device such as a desktop computer, laptop, smartphone device, tablet computer, terminal, personal digital assistant (PDA), e-book reader, television set top box, smart watch and wearable devices, or any computing device having a central processing unit and memory unit capable of connecting to a network. A client device may also comprise a graphical user interface (GUI) or a browser application provided on a display (e.g., monitor screen, LCD or LED display, projector, etc.).

A client device 102 may vary in terms of capabilities or features. For example, a web-enabled client device, which may include one or more physical or virtual keyboards, mass storage, one or more accelerometers, one or more gyroscopes, global positioning system (GPS) or other location identifying type capability, or a display with a high degree of functionality, such as a touch-sensitive color 2D or 3D display. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games.

A client device may include or execute a variety of operating systems, including a personal computer operating system, such as a Windows, Mac OS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Instagram, Pinterest, or Google+, to provide only a few possible examples.

The term "social network" refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks. A social network may be employed, for example, to identify additional connections for a variety of activities, including, but not limited to, dating, job networking, receiving or providing service referrals, content sharing, creating new associations, maintaining existing associations, identifying potential activity partners, performing or supporting commercial transactions, or the like. A social network may include individuals with similar experiences, opinions, education levels or backgrounds. These relationships are generally maintained by a service provider using a data store that maintains user profiles with entries that interrelate the various other users, groups, etc.

An individual's social network may refer to a set of direct personal relationships or a set of indirect personal relationships. A direct personal relationship refers to a relationship for an individual in which communications may be individual to individual, such as with family members, friends, colleagues, co-workers, or the like. An indirect personal relationship refers to a relationship that may be available to an individual with another individual although no form of individual to individual communication may have taken place, such as a friend of a friend, or the like. Different privileges or permissions may be associated with relationships in a social network. A social network also may generate relationships or connections with entities other than a person, such as companies, brands, or so called 'virtual persons.' An individual's social network may be represented in a variety of forms, such as visually, electronically or functionally. For example, a "social graph" or "socio-gram" may represent an entity in a social network as a node and a relationship as an edge or a link.

The client device 102 includes a program product including a machine-readable program code for causing, when executed, the client device to perform steps for creating a personalized digital world map with server 104. The program product may include software which may either be loaded onto the client device 102 or accessed by the client device 102. For example, the loaded software may include an application on a smart device. The software may also be accessed by the client device using a web browser. The client device may access the software on a web server (e.g., server 104) via the web browser using the network 108.

Network 108 may be any suitable type of network allowing transport of data communications across thereof. The network 108 may couple devices so that communications may be exchanged, such as between servers and client devices or other types of devices, including between wireless devices coupled via a wireless network, for example. A network may also include mass storage, such as network attached storage (NAS), a storage area network (SAN), cloud computing and storage, or other forms of computer or machine readable media, for example. In one embodiment, the network may be the Internet, following known Internet protocols for data communication, or any other communication network, e.g., any local area network (LAN) or wide area network (WAN) connection, extranet, intranet, host server, internet cloud, cellular network, wire-line type connections, wireless type connections, or any combination thereof. Communications and content stored and/or transmitted to and from client devices may be encrypted using, for example, the Advanced Encryption Standard (AES) with a 256-bit key size, or any other encryption standard known in the art.

Server 104 is coupled to a personalized map database 110. Personalized map database 110 may contain digital world maps and media files (e.g., video, audio, images, binary files, etc.) that are associated with the maps. The server 104 is operative to receive and process requests to create and gain access to personalized maps from the client device 102 (by either an application or a browser) across the network 108. Media files from client device 102 or from an external source (e.g., from cloud storage or social networking site) may be selected by users for upload to server 104 for personalizing their digital maps.

Server 104 is operable to communicate with social networking servers 106 to connect to social networking accounts. Users may display their maps on their social networking accounts. A user may log into their social media account to share their progression in creating and personalizing their map. Progress may be shared on any of the major social networking sites, such as but not limited to: Facebook, Twitter, Instagram and Pinterest.

Servers, as described herein, may vary widely in configuration or capabilities but are comprised of at least a special-purpose digital computing device including at least one or more central processing units and memory. A server may also include one or more of mass storage devices, power supplies, wired or wireless network interfaces, input/output interfaces, and operating systems, such as Windows Server, Mac OS X, Unix, Linux, FreeBSD, or the like.

The computer-based data processing system and method described above is for purposes of example only and may be implemented in any type of computer system or programming or processing environment, or in a computer program, alone or in conjunction with hardware. The present invention may also be implemented in software stored on a computer-readable medium and executed as a computer program on a general purpose or special purpose computer. For clarity, only those aspects of the system germane to the invention are described and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

Figure 2:
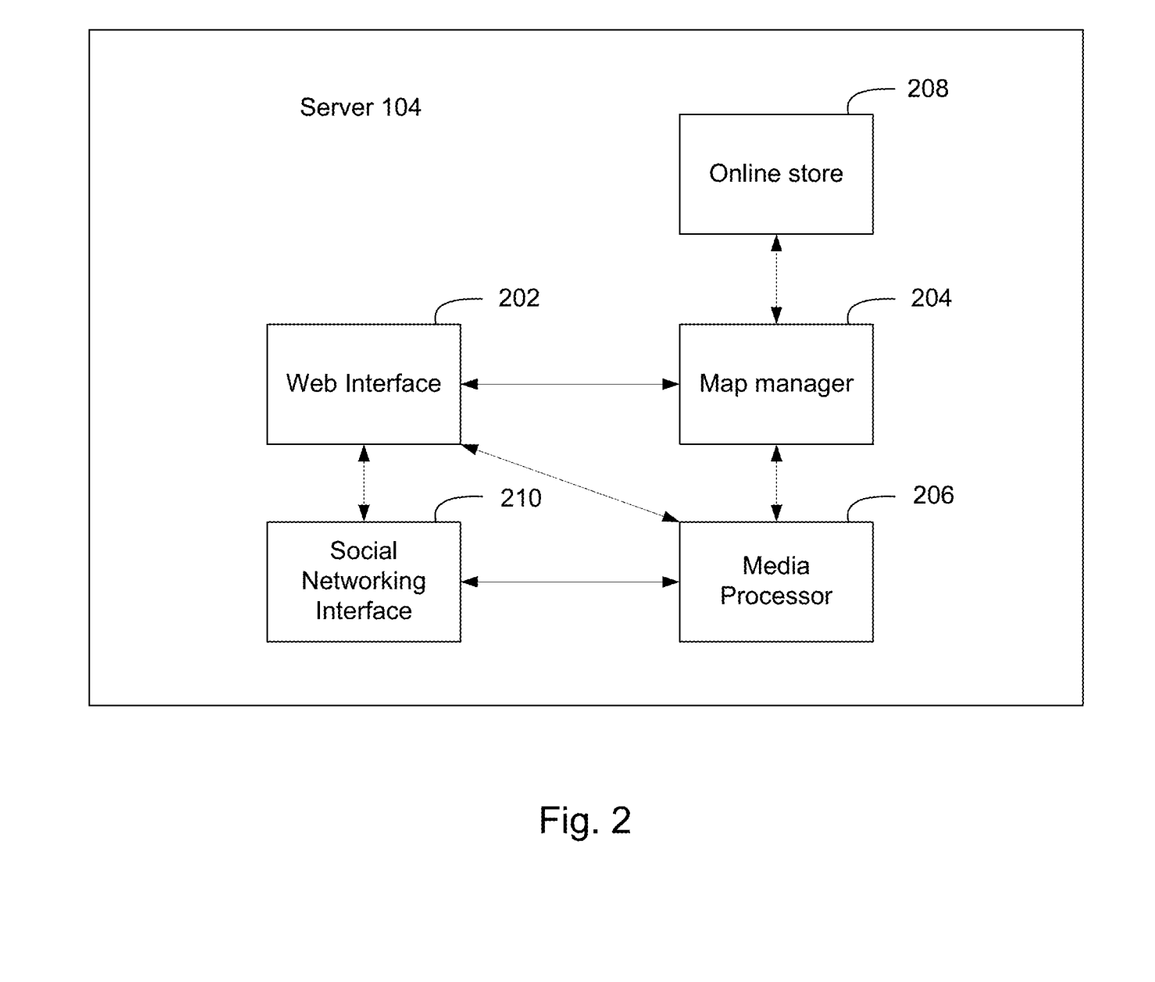
FIG. 2 illustrates a server for generating personalized maps according to an embodiment of the present invention.

FIG. 2 presents a server for generating personalized maps according to an embodiment of the present invention. Client devices may connect to server 104 via web interface 202. Users of client devices may create usernames, login information and accounts to access map manager 204. Map manager 204 includes functionality for generating and modifying personalized digital maps for the users. The map manager 204 is operable to receive media files and associate them with locations on the digital maps. A digital map may include a geographical map of the world including one or more continents, countries, states, and cities, etc. A user may create a digital map with his/her user account and upload various media files for inclusion on their digital map. The media files may include photographs and videos taken by the user at specific geographical locations that can be identified on their digital map.

Media files may be received from a user of a client device by media processor 206 for parsing, and optionally, formatting, for association and attachment to the digital map of the user. Online store 208 provides for the ability to purchase virtual goods and features by the user through map manager 204. For example, users can purchase map items or access to map components to complete their world maps. Social networking interface 210 may access information from a user's social networking account and use the information to create accounts with server 104 and to share digital maps to the social networking accounts of users.

Figure 3:
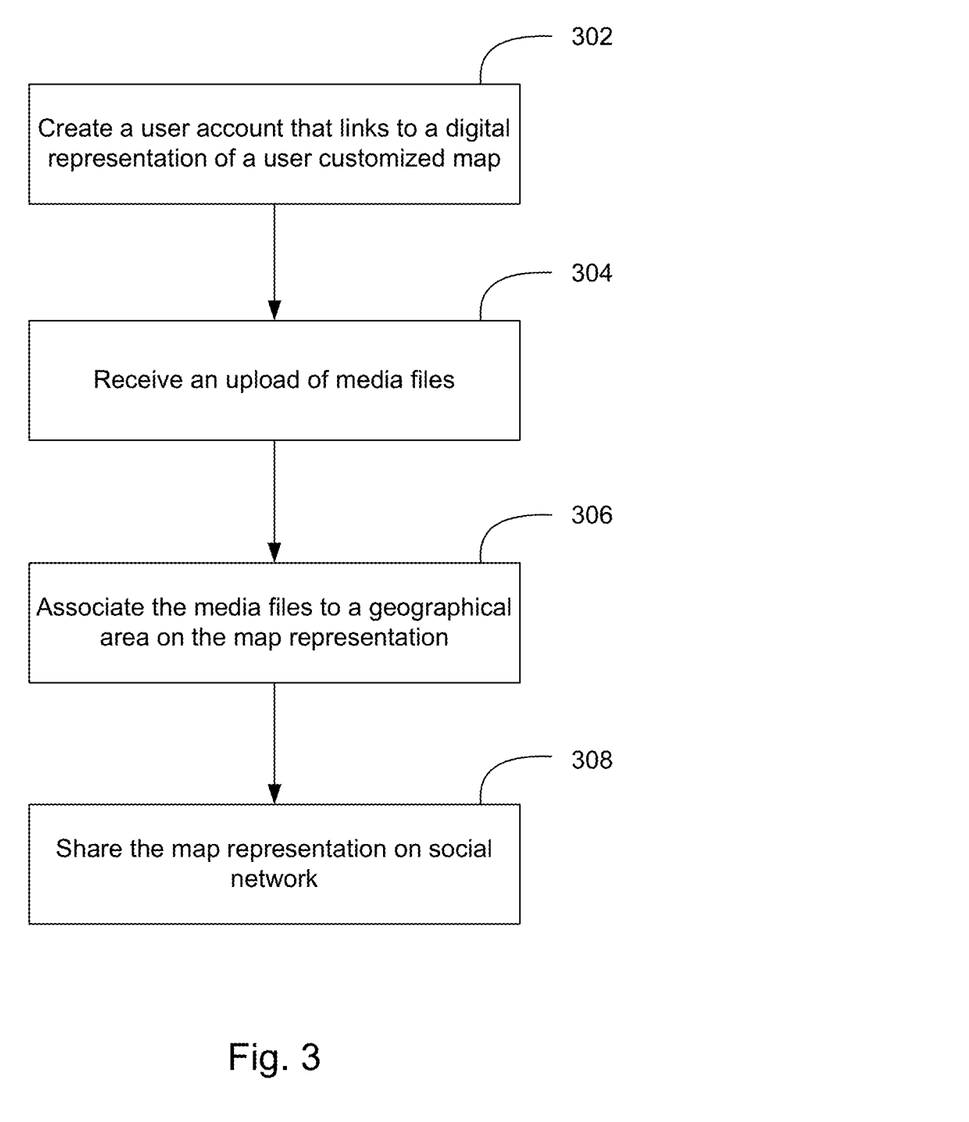
FIG. 3 illustrates a flowchart of a method for personalizing maps according to an embodiment of the present invention.
Figure 4:
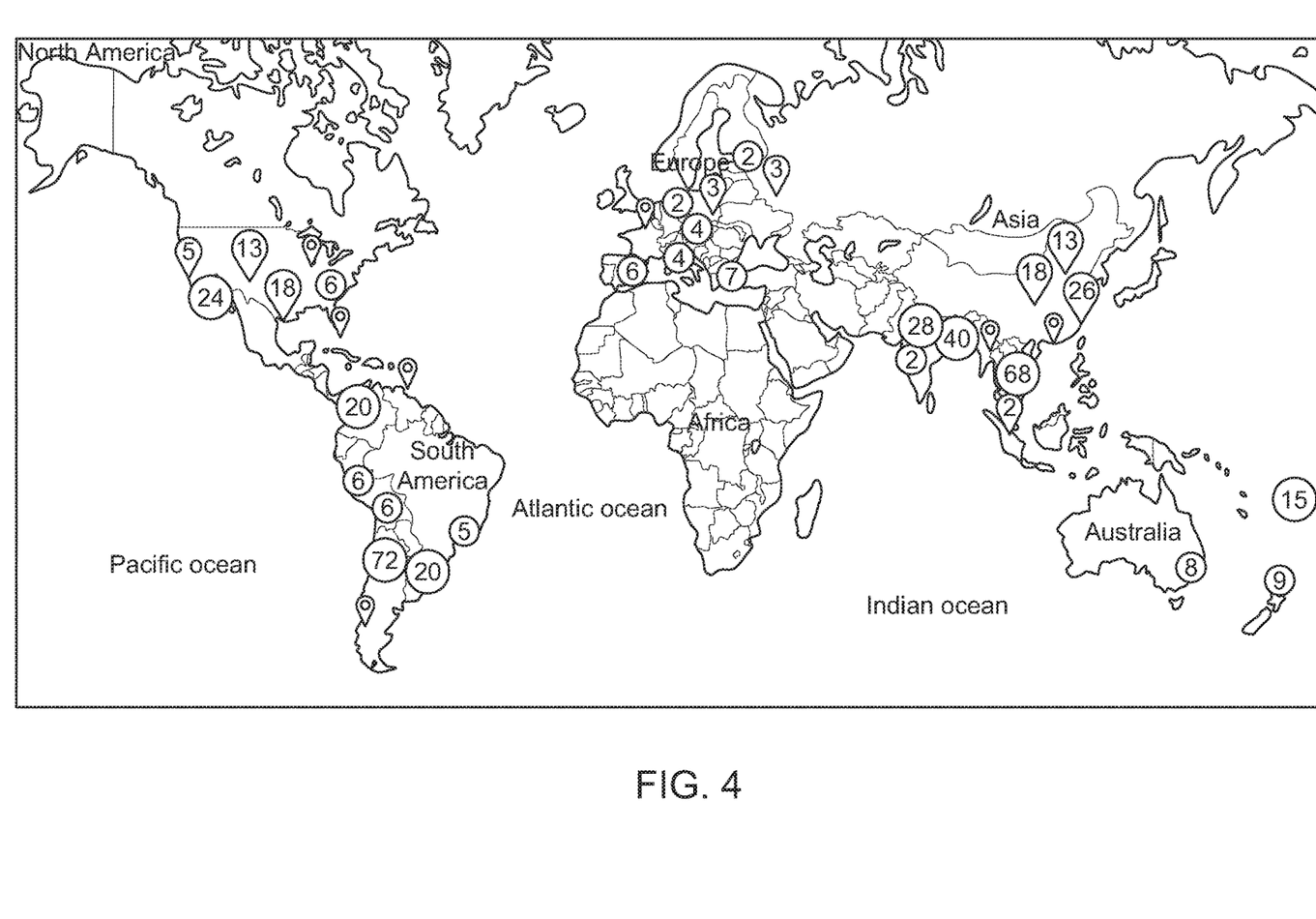
FIG. 4 through FIG. 8 illustrates an exemplary digital maps according to embodiments of the present invention.
Figure 5:
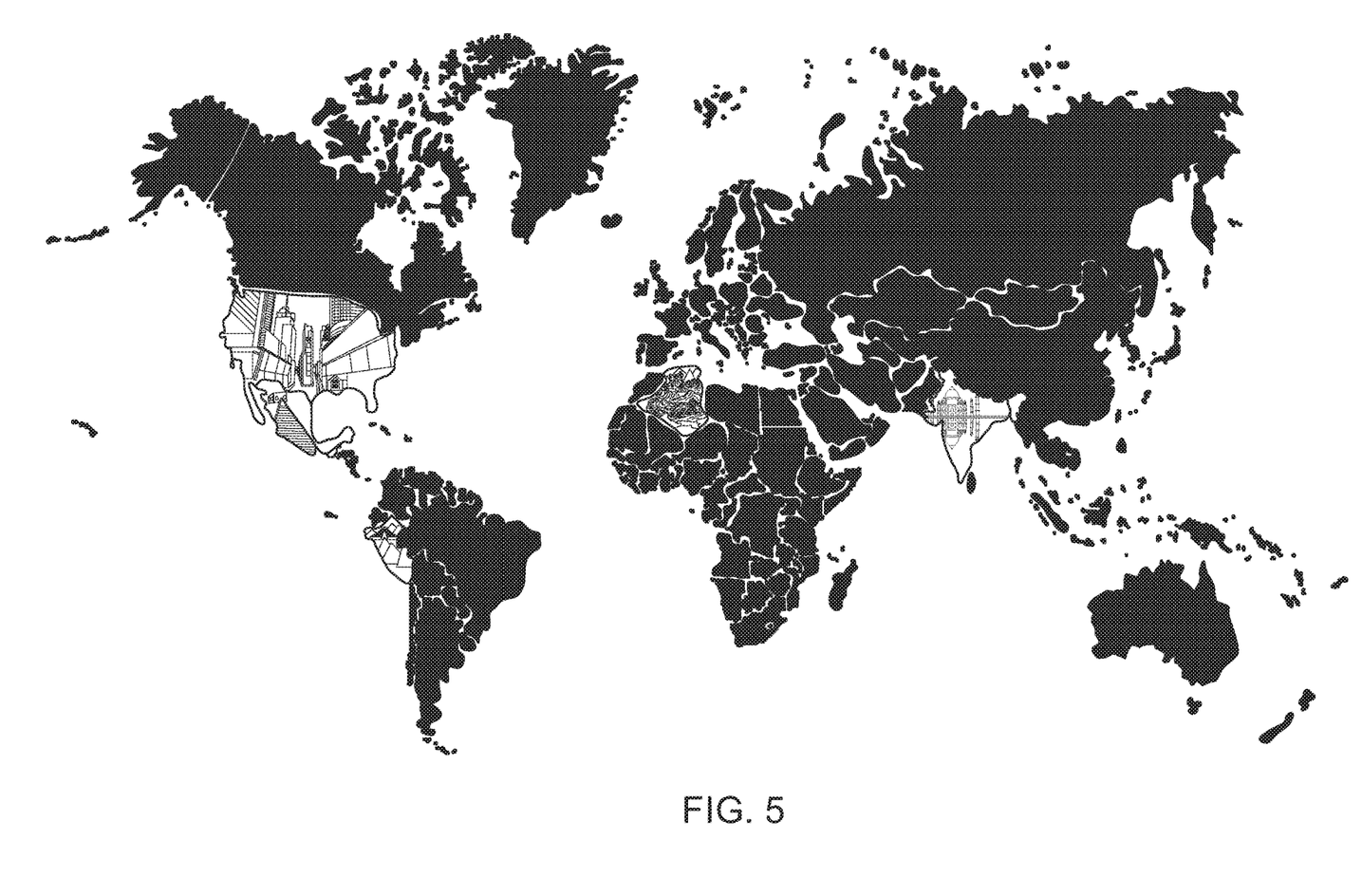

FIG. 3 presents a flowchart of a method for personalizing maps according to an embodiment of the present invention. A user account that links to a digital representation of a user customized map is created, step 302. The user may create an account and then gain access to a personal digital world map on a server (e.g., a home screen or what would be seen as a newsfeed on a social networking page such as Facebook). FIG. 4 presents an exemplary digital map according to an embodiment of the present invention. Initially, the personal digital map may comprise a current location-based map with states/countries left blank (i.e., solid fill). In other words, only areas covered by water, ice, or that are un-inhabitable may be displayed. The user may subsequently purchase different continents (including countries and states) to complete their world map at any time, as presented in FIG. 5 through FIG. 8.

An upload of media files is received, step 304. For example, at least one of pictures and/or videos may be uploaded to the digital map representation on the server. The media files may have metadata associated therewith, including information regarding the location and time that the media files were created. The media files may then be associated to a geographical area on the map, step 306. Media files uploaded to the server can be utilized to build the digital map representation. As media files are uploaded by the user from their client device, locations on their personal digital map representation may be filled out with content from the media files, e.g., based on information obtained from the metadata. That is, a world map, such as the one shown in FIG. 5, may have an empty slot associated with each country. Uploading media files that were captured in a particular country will result in the empty slot for that country being filled with content from at least one of the media files (for example, of the user's choosing). According to one embodiment, albums may be created for locations on the digital map representation where uploaded media files may be grouped into corresponding albums. In this regard, there may be albums corresponding to geographic regions, such as countries, and sub-regions, such as states, cites, etc.

Referring to the earlier example, the at least one of pictures and/or video are associated to an area of the map that the pictures and video were taken. Geo-tags may be embedded in the media files uploaded to the server including specific location details. If no geo-tag is available, the user may be able to input location information for the server to associate with the media files and build the digital map representation accordingly by placing the media files into appropriate albums. The user may further upload audio and text inputs to their digital map representation. Once the pictures have been uploaded, the user may have the chance to manually add text or record their own audio to dictate their personal story. This adds a level of personalization. Each vacation (e.g., set of pictures) taken at a location may offer the chance to add the user's story.

Figure 6:
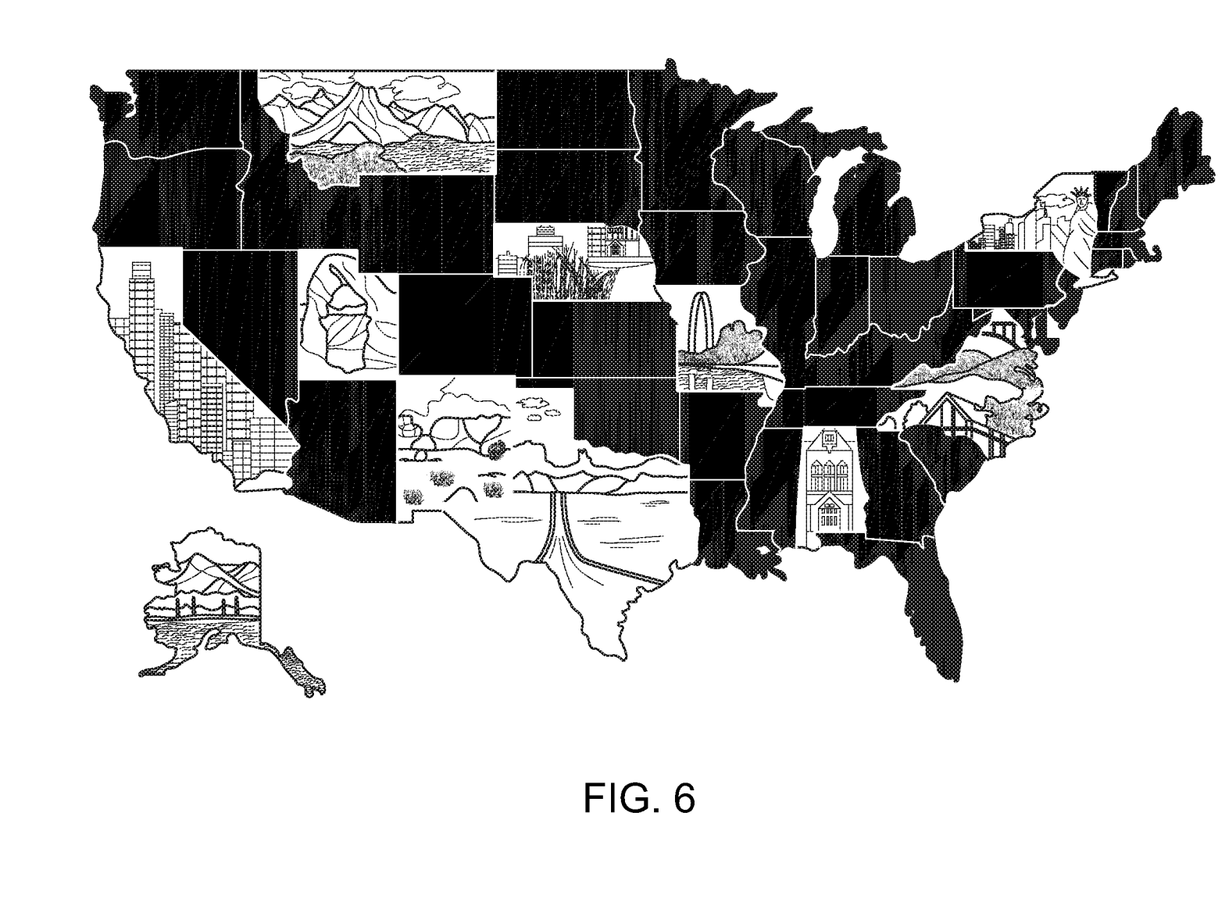
Figure 7:
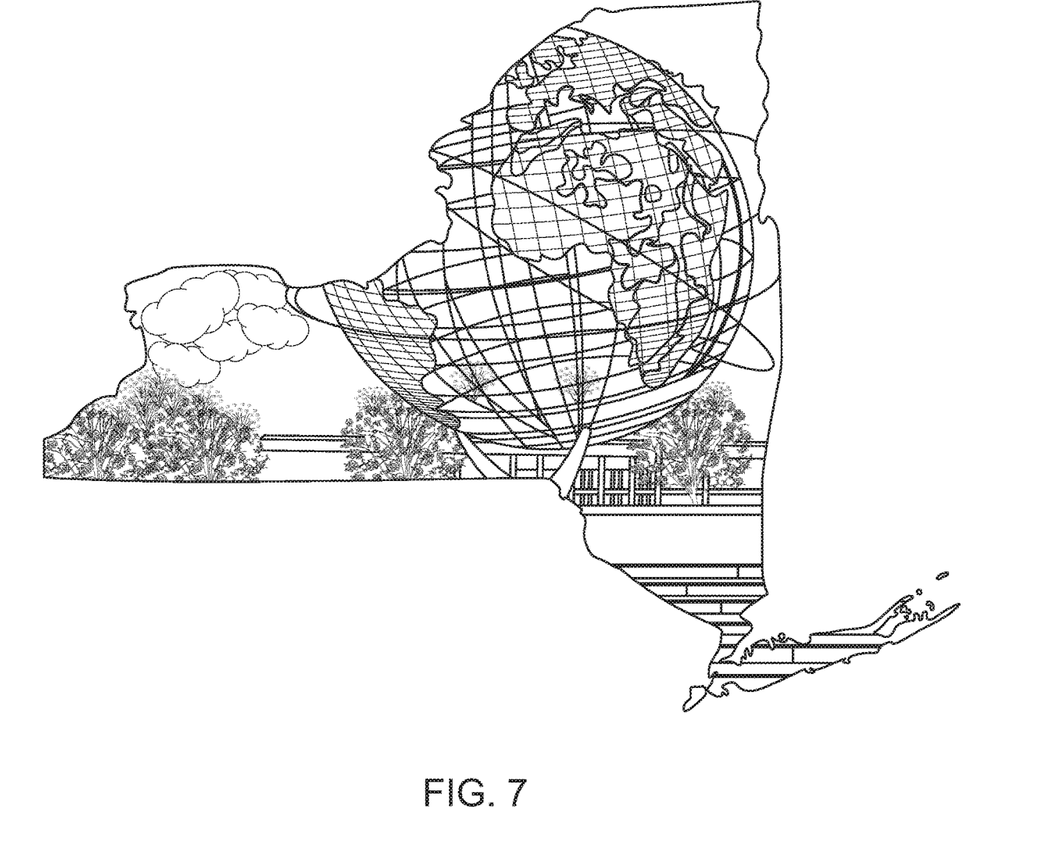
Figure 8:
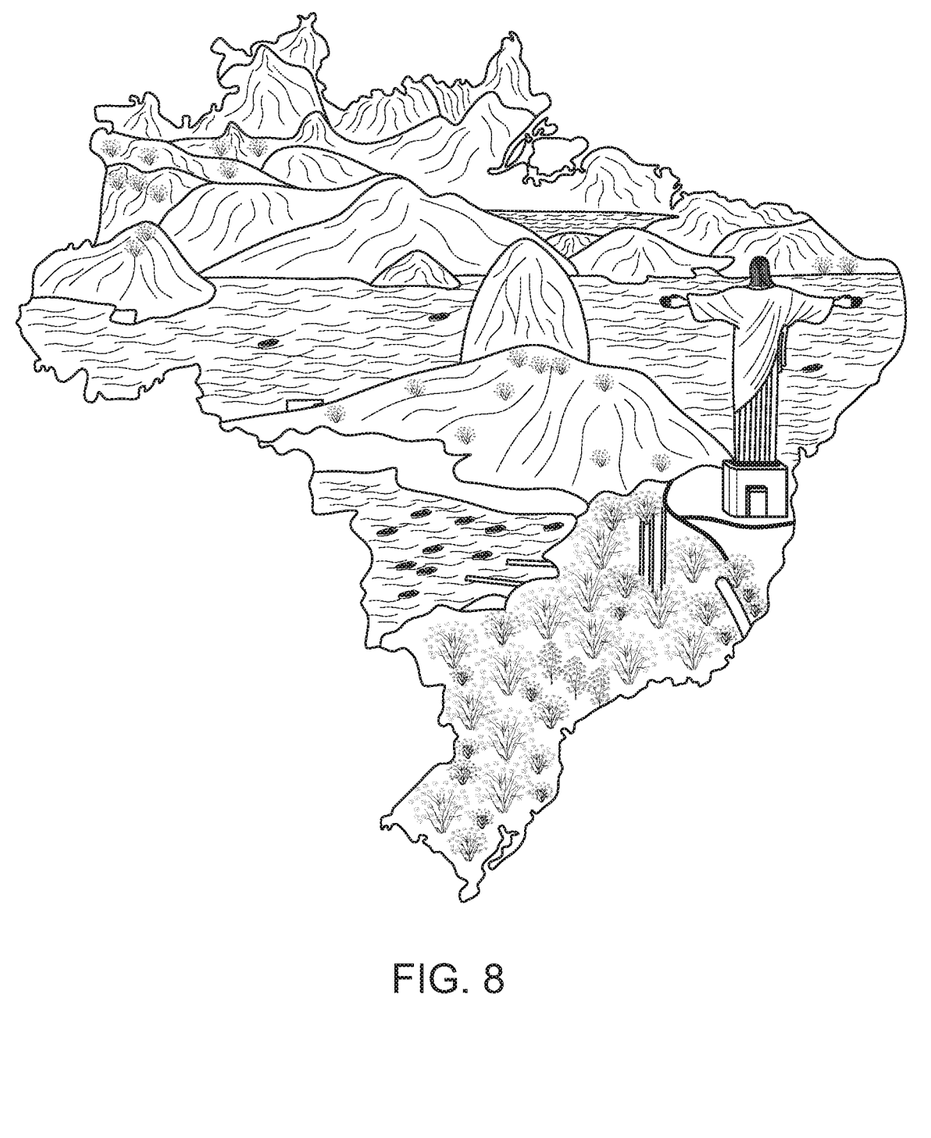

The user may select and view a particular continent on their map, which will cause a continent map to be displayed. A user may zoom in to reveal that continent's particular countries/states. This provides for a more detailed personal map and personal story. That is, the sub-region will be displayed with empty slots corresponding to sub-regions thereof (i.e., sub-sub-regions). For example, drilling down from the world map, to the U.S. map, will result in a display of a map of the US with slots for each state. The slots with no media file association will be blank whereas slots with media file associations will show content from at least one of the media files filling the slot, as shown in FIG. 6. Drilling down further may result in the display of the outline of the particular state as shown in FIG. 7. Each country map may be high-definition quality with regular geographical updates. In certain embodiments, when the user clicks on the display an area associated with a particular location on their world map (at any of the drill down levels), they may be given a set of options. If there are pictures present (a vacation or event personalized by the user for that particular geographic area), the user may be able to choose the particular vacation or event by a timeline list. For example, selecting the map of the U.S. may result in a list of vacations or events in the U.S. being generated. Similarly, selecting a State may result in a list of vacations or other events in the given State being generated. After choosing the event they would like to view, the user may be presented with two options to select from: text (such as a picture/text display which allows the user and/or viewers to manually transition to each picture—this would include user defined text) and dictation such as a slideshow with recorded audio.

The map representation may be shared on social network, step 308. A user's map representation may be posted to and displayed on user accounts on social networking websites. That is, a link is associated with the selected vacation/event and option, which may be shared with others on the social network. An image of the geographic area associated with the selected vacation/event may also be generated for sharing with the link on the social network. During their progression in creating their map, the user may log into their social network account and share their progress. The user may also be able to keep up with maps of friends and family.

Figure 9:
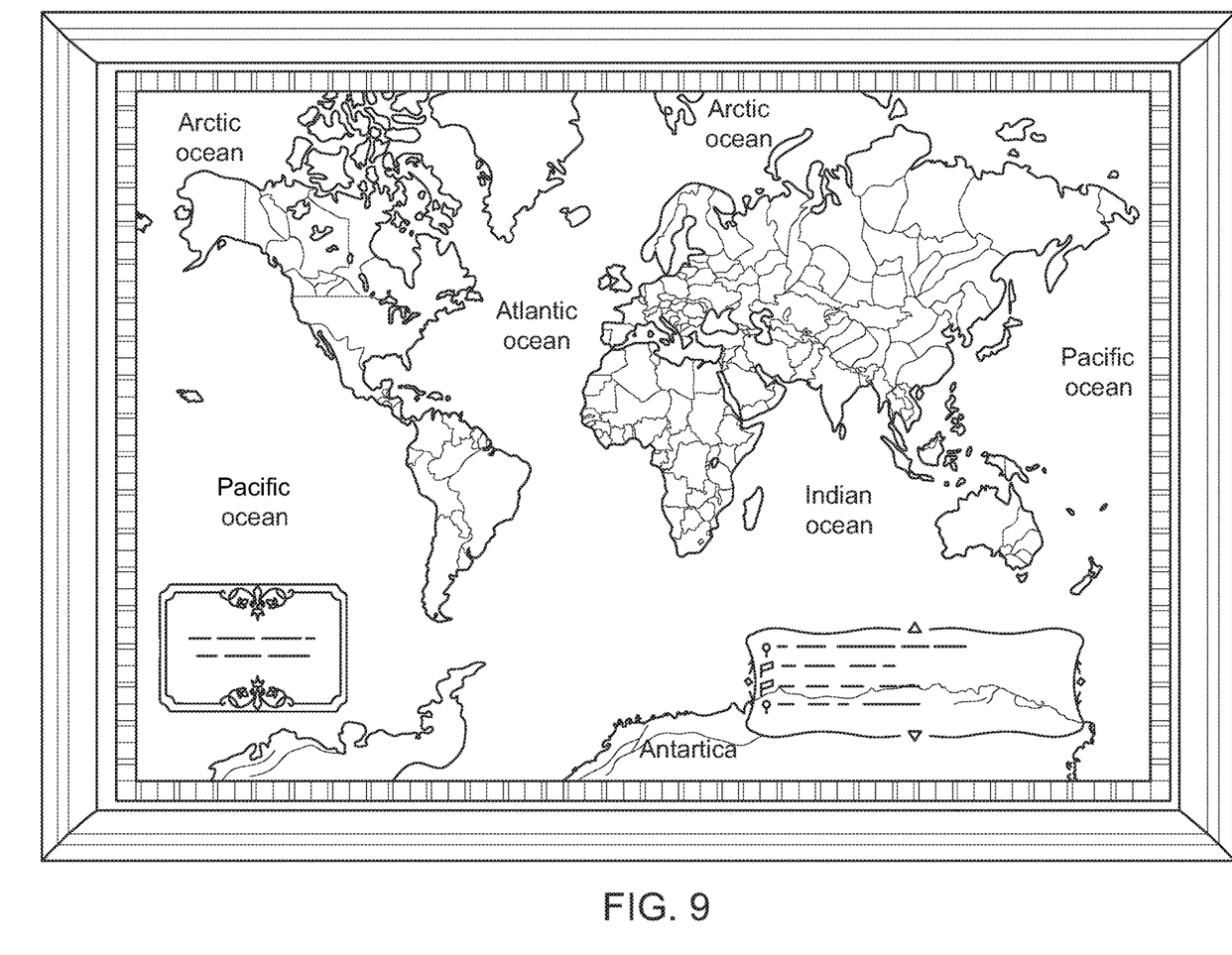
FIG. 9 illustrates a consumer electronic device according to an embodiment of the present invention.

The user may also be offered a pro plan and in-home installation of a personalized world map device. FIG. 9 depicts a consumer electronic device displaying a world map. The personalized world map device may include processor, memory, network interface, and display screen components within a housing that can be installed on a wall or shelf. The personalized world map device may connect to a wireless network connection such as a home WiFi signal and establish communications with an application (e.g., a personal digital map application, as described herein) on a client device. When a user clicks on a continent in the application on the client device while in communication with the personalized world map device, the personalized world map device may reconfigure and show the countries/states within that continent as discussed herein. This provides a full screen display of their travels in that continent/country/state and allows for a more entertaining and interactive view.

FIGS. 1 through 9 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps). In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer readable medium," "computer program medium," and "computer usable medium" are used to generally refer to media such as a random access memory (RAM); a read only memory (ROM); a removable storage unit (e.g., a magnetic or optical disc, flash memory device, or the like); a hard disk; or the like.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A computer implemented method for publishing a personalized map of a user's past travels for each of a plurality of users, comprising:
    receiving, via a server computer coupled to at least one client device associated with a first of the plurality of users over a communications network, a plurality of media files from at least one of a plurality of media storage locations associated with the first user, each of the plurality of media files associated with the first of the plurality of users' past travels and selected by the first of the plurality of users for upload to the server computer from the at least one client device or an external source for inclusion in a personalized map for the first user;
    providing, via the server computer, a plurality of personal maps, wherein the plurality of personal maps comprise a map of a geographic region and a map of sub-regions of the geographic region, wherein the map of the geographic region comprises a plurality of slots associated with the geographic region and the plurality of sub-regions thereof, each of the plurality of slots having a shape of the respective geographic region and the respective plurality of sub-regions, wherein the plurality of slots associated with the plurality of sub-regions thereof are initially generated when viewed by the first user with an opaque single-color solid fill, and wherein the plurality of slots initially have no media files associated therewith;
    associating, via the server computer, each of the plurality of media files with at least one geographical location on each of the plurality of personal maps, the geographical location associated with the first of a plurality of users' past travels, wherein the plurality of media files are associated with the plurality of personal maps based on a geo-tag embedded in the media files or the user's input of location information, and wherein the plurality of media files are associated with a plurality of events;
    causing an interface to be displayed at the at least one client device, the interface displaying a unique personalized map of the geographic region with the plurality of slots associated with the plurality of sub-regions thereof based on the association of each of the plurality of media files with the plurality of personal maps, wherein slots having at least one of the plurality of media files associated therewith are generated on the interface screen to include content from the at least one of the associated media files with the content from the associated media file filling the shape of the respective geographic region and the respective plurality of sub-regions and wherein slots not having at least one of the plurality of media files associated therewith are generated on the interface screen with the opaque single-color solid fill, each of the sub-regions on the map of the geographic region representing a clickable area for drilling down to a selected sub-region, wherein clicking on one of the sub-regions causes the interface to display the sub-region of the geographic region; and
    generating or causing the interface to display for at least one geographic level a list of events associated with the personalized map of the at least one geographic level.

2. The method of claim 1, comprising associating each of the plurality of media files with a map of a sub-sub-region of the geographic region.

3. The method of claim 2, comprising causing the interface to display a sub-region of the geographic region with a plurality of slots associated with a plurality of sub-sub-regions of the geographic region, each of the sub-sub-regions on the map of the sub-region geographic region representing a clickable area for drilling down to a selected sub-sub-region.

4. The method of claim 3, wherein the plurality of slots each have a shape of the respective sub-sub regions.

5. The method of claim 4, wherein at least one of the media files is associated with a first sub-region and another of the media files is associated with a second sub-region, the method comprising generating a list of events at a geographic level associated with the geographic region comprising events associated with both the first and second sub-regions, and a list of events at a geographic level associated with the sub-regions comprising events associated with only a selected sub-region.

6. The method of claim 5, comprising receiving a selection of an event and generating a link to a slideshow presentation of the media files associated with the selected event.

7. The method of claim 5, comprising receiving a selection of an event and generating a link to a presentation comprising audio associated with the event.

8. A computer system comprising at least one server computer coupled over a communications network to at least one client device associated with a first of a plurality of users, the at least one server computer having software associated therewith that when executed causes the server to perform a method for publishing a personalized map of a user's past travels for each of the plurality of users, comprising:
    receiving a plurality of media files from at least one of a plurality of media storage locations associated with the first user, each of the plurality of media files associated with the first of the plurality of users' past travels and selected by the first of the plurality of users for upload to the server computer from the at least one client device or an external source for inclusion in a personalized map for the first user;
    providing a plurality of personal maps, wherein the plurality of personal maps comprise a map of a geographic region and a map of sub-regions of the geographic region, wherein the map of the geographic region comprises a plurality of slots associated with the geographic region and the plurality of sub-regions thereof, each of the plurality of slots having a shape of the respective geographic region and the respective plurality of sub-regions, wherein the plurality of slots associated with the plurality of sub-regions thereof are initially generated when viewed by the first user with an opaque single-color solid fill, and wherein the plurality of slots initially have no media files associated therewith;

associating each of the plurality of media files with at least one geographical location on each of the plurality of personal maps, the geographical location associated with the first of a plurality of users' past travels, wherein the plurality of media files are associated with the plurality of personal maps based on a geo-tag embedded in the media files or the user's input of location information, and wherein the plurality of media files are associated with a plurality of events;

causing an interface to be displayed at the at least one client device, the interface displaying a unique personalized map of the geographic region with the plurality of slots associated with the plurality of sub-regions thereof based on the association of each of the plurality of media files with the plurality of personal maps, wherein slots having at least one of the plurality of media files associated therewith are generated on the interface screen to include content from the at least one of the associated media files with the content from the associated media file filling the shape of the respective geographic region and the respective plurality of sub-regions and wherein slots not having at least one of the plurality of media files associated therewith are generated on the interface screen with the opaque single-color solid fill, each of the sub-regions on the map of the geographic region representing a clickable area for drilling down to a selected sub-region, wherein clicking on one of the sub-regions causes the interface to display the sub-region of the geographic region; and generating or causing the interface to display for at least one geographic level a list of events associated with the personalized map of the at least one geographic level.

9. The system of claim 8, the method comprising associating each of the plurality of media files with a map of a sub-sub-region of the geographic region.

10. The system of claim 9, the method comprising causing the interface to display a sub-region of the geographic region with a plurality of slots associated with a plurality of sub-sub-regions of the geographic region, each of the sub-sub-regions on the map of the sub-region geographic region representing a clickable area for drilling down to a selected sub-sub-region.

11. The system of claim 10, wherein the plurality of slots each have a shape of the respective sub-sub regions.

12. The system of claim 11, wherein at least one of the media files is associated with a first sub-region and another of the media files is associated with a second sub-region, the method comprising generating a list of events at a geographic level associated with the geographic region comprising events associated with both the first and second sub-regions, and a list of events at a geographic level associated with the sub-regions comprising events associated with only a selected sub-region.

13. The method of claim 12, the method comprising receiving a selection of an event and generating a link to a slideshow presentation of the media files associated with the selected event.

14. The system of claim 12, the method comprising receiving a selection of an event and generating a link to a presentation comprising audio associated with the event.

* * * * *